United States Patent Office 3,291,449
Patented Dec. 13, 1966

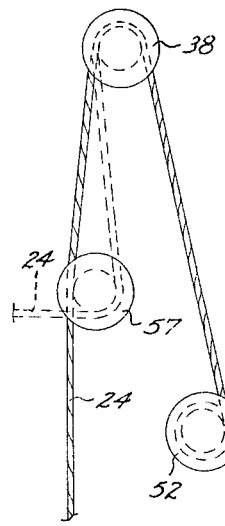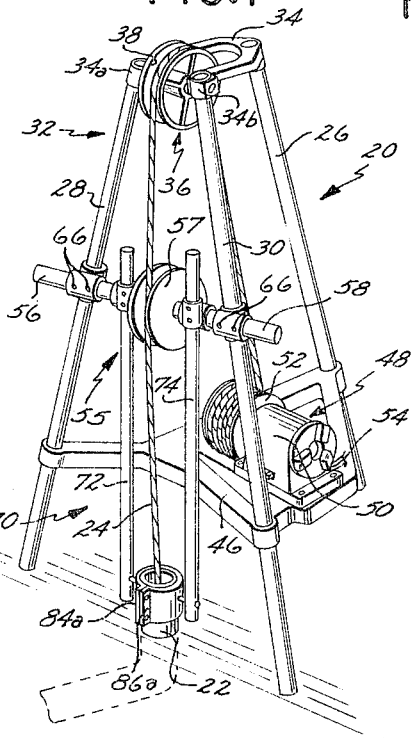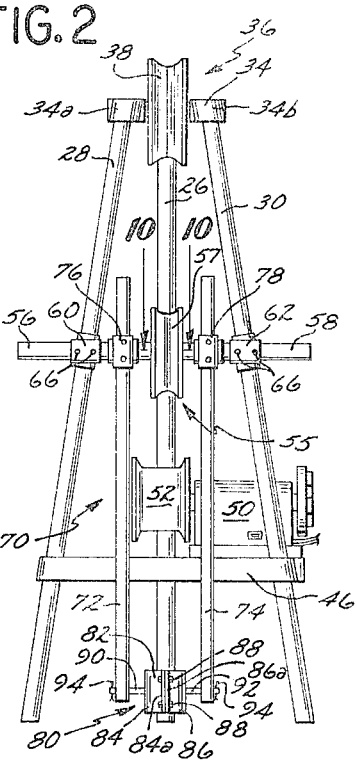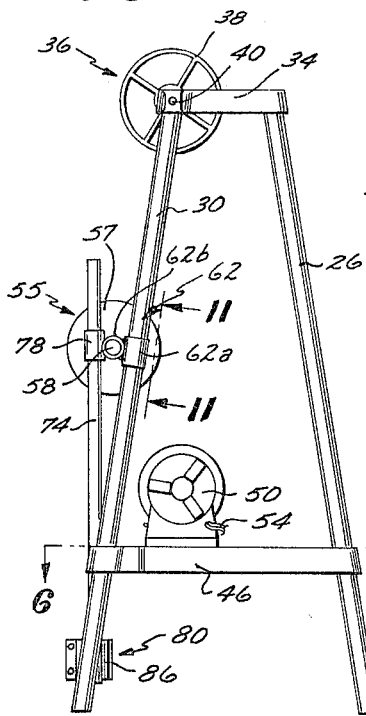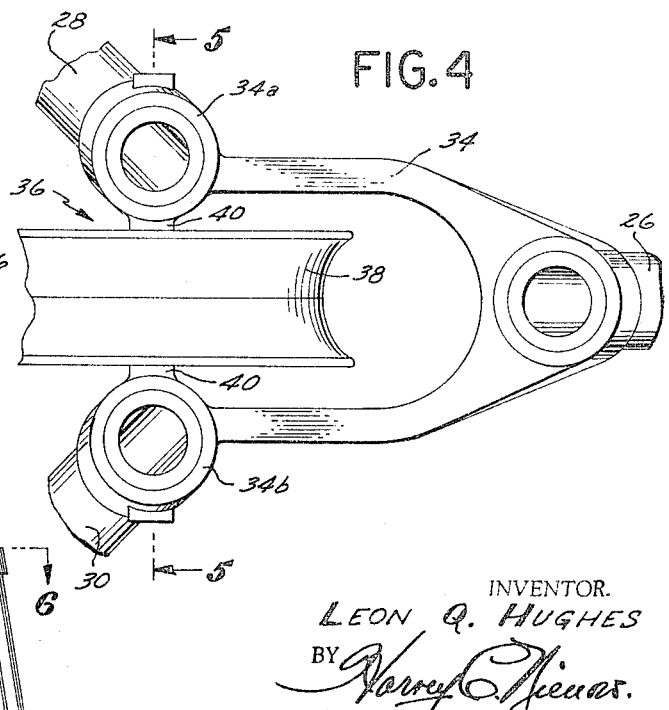

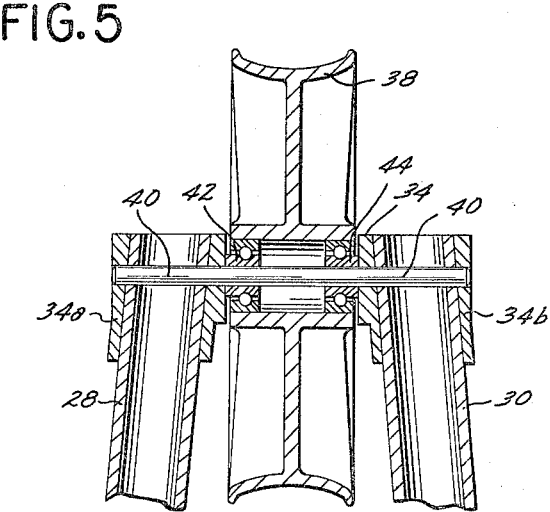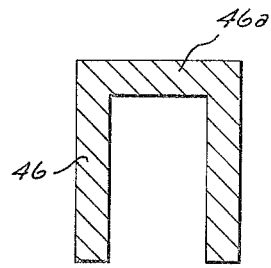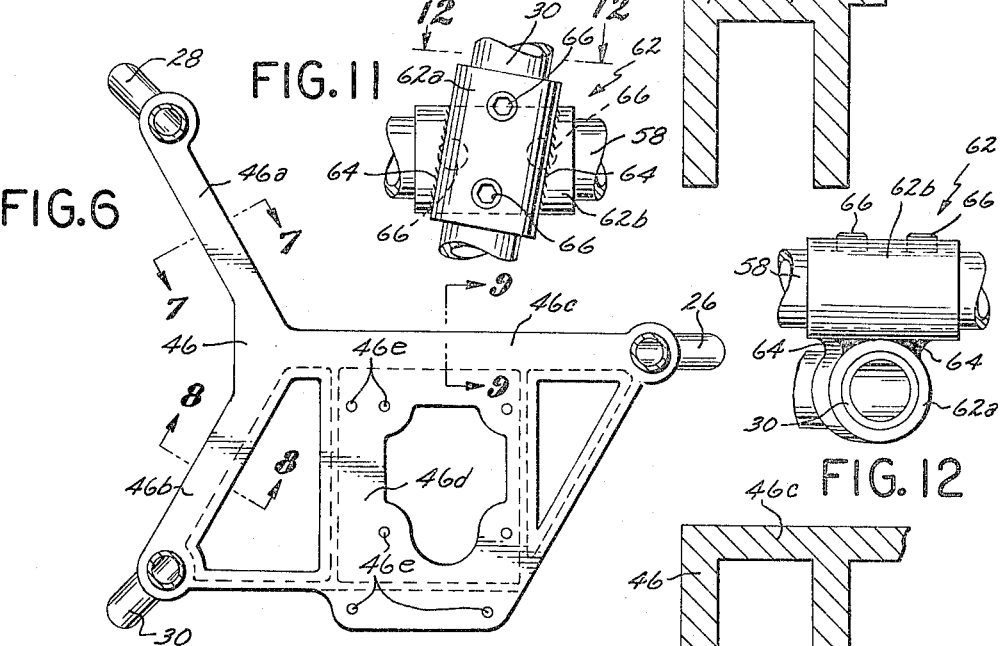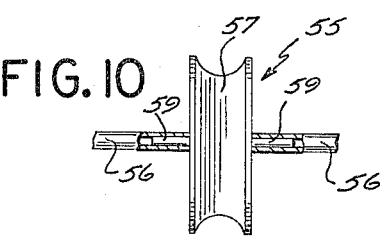

3,291,449
CABLE PULLERS
Leon Q. Hughes, 1934 Placentia Ave., Costa Mesa, Calif.
Filed Dec. 10, 1964, Ser. No. 417,416
7 Claims. (Cl. 254—134.3)

The present invention relates generally to cable pullers, and more particularly to portable structures for use in automatically pulling electrical conductors through conduits and the like.

The steady increase in population within recent years has resulted in a corresponding steady increase in the number of residential, industrial and office building. In fact, in certain geographical locations of the United States, population and building growth has been nothing short of phenomenal.

Within the past several decades, electrically operated devices and instruments of substantially every type and description have been brought onto the market. Most of these electrically operated contrivances are for use in the home, office or industrial shop, and are intended to lessen the work load of individuals or to speed up processes heretofore carried out manually. Such increase in the use of appliances and other electrical devices has resulted in the requirement of additional or more extensive electrical wiring for virtually every type of building. That is, due to the advent of additional electrical devices, there has developed the need for additional electrical outlets as well as additional auxiliary equipment such as wiring, cables and the like. Also the newer and perhaps more sophisticated equipment has resulted in the need for increased electrical power. In order to accomplish automatically many operations and functions which were heretofore performed manually, increased demands are placed on the electrical energy to perform the work.

The above factors have resulted in an appreciable increase in the installation of household and industrial wiring. In new construction as well as in the remodeling of existing buildings, it has become necessary to insert electrical cables or wiring in relatively small and very long electrical conduits.

Heretofore, such cabling has usually been manually drawn through the conduits by a group of men physically pulling a cord or line through the conduit, the cable being attached to one end of such line. Needless to say, the pulling of electrical cables through conduits by this method has been found to be extremely expensive since the primary cost today in either the manufacturing of a product or in providing a service is the cost of the manual labor involved.

To decrease such cost of installing electrical wiring in a given building, it has been realized for some time that an electrically powered cable puller which can be conveniently transported from one location to another would be extremely desirable. Devices heretofore available for satisfying this need have been less than satisfactory due to any one of various shortcomings. Some such devices have been extremely difficult to operate, being either very cumbersome and hence virtually non-transportable, or have been incapable of providing sufficient power for pulling the cables through relatively small conduits.

In view of the foregoing, it is an object of the present invention to provide a cable puller for use in pulling relatively large electrical cables through conduits in existing buildings.

Another object of the present invention is to provide a cable puller as characterized above which is relatively light weight so as to be transportable from one location to another with minimum difficulty and inconvenience.

Another object of the present invention is to provide a cable puller as characterized above which can be operated by a single person to pull electrical cables through a conduit.

Another object of the present invention is to provide a cable puller as characterized above having means for rigidly securing such cable puller to the conduit through which the cable is being pulled.

Another object of the present invention is to provide a cable puller as characterized above which employs electrically energizable power means for pulling the electrical cable through the conduit.

A further object of this invention is to provide a cable puller as characterized above which is simple and inexpensive to manufacture, and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a perspective view of a cable puller according to the present invention;

FIGURE 2 is a front elevational view of such cable puller;

FIGURE 3 is a side elevational view thereof;

FIGURE 4 is a fragmentary top view of such cable puller;

FIGURE 5 is a sectional view taken substantially along line 5—5 of FIGURE 4 of the drawings;

FIGURE 6 is a sectional view taken substantially along line 6—6 of FIGURE 3 of the drawings;

FIGURE 7 is a sectional view taken substantially along line 7—7 of FIGURE 6;

FIGURE 8 is a sectional view taken substantially along line 8—8 of FIGURE 6 of the drawings;

FIGURE 9 is a sectional view taken substantially along line 9—9 of FIGURE 6 of the drawings;

FIGURE 10 is a fragmentary sectional view taken substantially along line 10—10 of FIGURE 2 of the drawings;

FIGURE 11 is a fragmentary side elevational view taken substantially along line 11—11 of FIGURE 3;

FIGURE 12 is a top view taken substantially along line 12—12 of FIGURE 11 of the drawings; and FIGURE 13 is a diagrammatic side view of the pulleys and drum of the subject cable puller showing a rope or line thereover.

Like reference characters indicate corresponding parts throughout the several views of the drawings.

Referring to FIGURE 1 of the drawings, there is shown therein a cable puller identified generally with the numeral 20. Such cable puller is for use in pulling electrical cables and the like through a relatively small but elongated conduit 22 which may be embedded within the floor, wall or ceiling of an existing building or one which is under construction.

A rope or line 24 is positioned within the conduit 22 throughout its entire length, and has one end (not shown) attached to the electrical cable (also not shown) to be pulled or drawn through the conduit. Heretofore, such electrical wiring or cable has been pulled through the conduit merely by having a group of men simultaneously pull on the line 24 until the cable replaces the line within the conduit 22.

Cable puller 20 comprises three elongated tubular support members 26, 28 and 30, which may take the form of aluminum or steel pipes angularly disposed to each other in spaced relation to provide a tripod frame 42 for the cable puller 20.

The upper end portions of the three support members 26, 28 and 30 are held in fixed relation by a yoke 34 which may be formed, in a casting operation, of aluminum or steel. Yoke 34 is generally U-shaped, as shown most clearly in FIGURE 4 of the drawings, and is provided with three openings in spaced relation for receiving the upper end portions of the support members. Any appropriate fastening means such as set screws and the like may be employed for firmly securing the yoke to the three support members.

Extending across the U-shaped configuration of yoke 34 between bosses 34a and 34b is a rotatable pulley 36. Such a pulley comprises a wheel 38 which rotates on an axle 40, the latter of which may extend through appropriate transverse openings in the bosses 34a and 34b so as to operate to fasten the support members 28 and 30 in fixed relation to the yoke 34. That is, as shown most clearly in FIGURE 5 of the drawings, the wheel 38 is rotatably mounted in the yoke 34, and this may be accomplished by means of an axle 40 which extends through suitable openings in bosses 34a and 34b as well as openings in the upper end portions of support members 28 and 30. Suitable bearing means as shown at 42 and 44 may be employed to afford wheel 38 relatively free rotation on axle 40. Such bearing members 42 and 44 may also serve as thrust bearings or positioning means for defining the position of wheel 38 between the support members 28 and 30.

Positioned between and connected to the three support members 26, 28 and 30 of the tripod frame 32 is a platform 46 which may take substantially any desired form or configuration. However, such platform 46 is attached to the respective support members intermediate the length or height of the cable puller 20. Such platform may be formed of any appropriate material, and is preferably cast of aluminum or steel in accordance with the specific strength and weight requirements.

As shown in FIGURES 7, 8 and 9, platform 46 may be formed with substantially any appropriate cross section commensurate with good engineering design principles to provide optimum strength where needed without providing excessive weight. The arms 46a, 46b and 46c of the member 46 constitute the primary support means for the platform 46 and hence are provided with appropriate cross sectional configurations to provide the desired strength.

Platform 46 is formed with a mounting area 46c for receiving and retaining a power unit 48. Such power unit may take substantially any desired form, but in its simplest and most convenient form is an electrical motor 50 which carries and operates a rotatable drum 52. Electrical lead wires 54 afford connection of motor 50 to an appropriate source of power through switch means (not shown) for controlling the operation and function to be performed.

Mounting area 46c is provided with a plurality of mounting holes, some of which are shown in 46e, for accommodating the base of virtually any type of appropriate electrical motor. As will be readily apparent to those persons skilled in the art, the central portion of mounting area 46d is removed to reduce the weight of the platform 46 without materially affecting the strength of the entire unit.

Any appropriate fastening or mounting means may be employed for securing platform 46 to the support members 26, 28 and 30. In this regard, it is contemplated that ordinary set screws threadedly positioned in the platform 26 may be employed to engage the respective support members so as to firmly secure the platform thereto.

Adjustably positioned on the support members 28 and 30 is a second pulley 55. Such pulley, as above explained with reference to the first pulley 36, may take substantially any appropriate form, but must have a freely rotatable wheel as shown at 57, for receiving line 24 as will hereinafter be explained in greater detail. For instance, it is contemplated that pulley 55 may comprise a wheel 57 mounted on an axle 59 through the use of appropriate bearing means. As such, the wheel 57 would be freely rotatable on and with respect to the axle 59. A support element comprising members 56 and 58 may be employed for receiving the opposite ends of axle 59, which members are adjustably positioned with respect to the support members 28 and 30 of the tripod frame 32. Such members 56 and 58 may be cylindrical aluminum stock formed with appropriate openings for receiving the opposite ends of axle 59.

Suitable connectors 60 and 62, the latter of which is most clearly shown in FIGURE 11 of the drawings, are provided for adjustably mounting the pulley 55 on the tripod 32. Each such connector comprises a pair of angularly disposed offset bushings or sleeves, as shown at 62a and 62b of FIGURE 11, to accommodate the respective support members. For instance, as shown in FIGURE 11 the bushing 62a is formed with a through opening for receiving the support member 30. The bushing 62b, on the other hand, is provided with a similar through opening for receiving the support member 58. The various bushings are welded together as at 64 to retain them in fixed relation.

Each such bushing or sleeve is provided with any appropriate fastening means such as set screws 66 as shown in FIGURES 1, 2 and 11. Through the appropriate use of such set screws 66, the entire mounting element for pulley 50 may be repositioned as desired, as will be readily apparent to those persons skilled in the art.

A cable puller of the type herein described creates a relatively large force on the cable being pulled through the conduit, sufficient to replace the manual force heretofore created by a group of men. In view of this, it is necessary that the cable puller be anchored in a fixed position throughout the entire period of operation. To accomplish this, my invention includes bracing means 70 to be extended along the rope or line being pulled and attached to a stationary point spaced from the cable puller itself.

Bracing means 70 comprises a pair of compression members 72 and 74 which are firmly secured to the support means for pulley 55, but on opposite sides of the latter. Such compression members may be formed of any appropriate material which exhibits sufficient strength and rigidity while under relatively heavy compressive loads. Since the subject device is for use in pulling, it becomes apparent that most appropriate bracing means would be compressive members extending toward the source from which the cable being pulled is originating.

The upper end of compression members 72 and 74 are secured to the support members 56 and 58 by suitable connectors 76 and 78. These latter connectors are not materially different from the connectors 60 and 62 described above for use in connecting members 56 and 58 to the respective support members of the tripod frame, but differ thereover merely by having the respective bushings or sleeves of the connectors 76 and 78 at substantially right angles to each other. That is, to insure proper alignment of the entire cable puller 20 to the conduit from which the cable is being drawn, the connector 76 and 78 are operable to position the compression members 72 and 74, of the bracing means 70, at substantially right angles to the adjustable mounting element for pulley 55.

Each of the connectors 76 and 78 is provided with suitable fastening or locking devices such as set screws whereby the compression members 72 and 74 can be firmly secured in fixed position relative to the remainder of the cable puller 20.

The lower portion of the compression members 72 and 74 are provided with anchoring means 80 whereby the bracing means 70 can be secured relative to the conduit 22. Such anchoring means comprises a split collar 82 provided with appropriate fastening flanges as at 84a and 86a respectively. Suitable fastening means such as nuts and bolts 88 may be employed for fastening the oppositely disposed flanges of the split collar 82 together so as to provided the desired annular collar.

Welded to opposite sides of the collar, as for instance to opposite sides of the sections 84 and 86, are pivot pins 90 and 92. Each such pin extends outwardly from the collar 82 in a direction substantially transverse of the central through opening of the collar itself.

The lower end portions of each of the compression members 72 and 74 is formed with a through transverse opening for slidably receiving the respective pivot pins 90 and 92. A cotter key is provided in suitable openings in the ends of the pivot pins 90 and 92 for retaining the compression members in proper position relative to the collar 82.

The subject cable puller 20 is positioned adjacent the conduit 22 through which the cable is to be pulled. Such conduit may extend outwardly in a vertical direction, out of either the floor or the ceiling of the particular building. On the other hand, such conduit 22, instead of being upwardly disposed as shown in FIGURE 1 of the drawings, may be horizontally oriented so that the pulling force should be in a horizontal direction to most conveniently pull the cable.

In any event, the collar 82 is firmly secured to the exposed end of the conduit 22. This is accomplished by loosening the fastening means 88, inserting the collar 82 on the conduit 22, and thereafter resecuring such fastening means 88 until the anchoring means 80 is substantially integral with the conduit. Thereafter, the lower end portion of the compression members 72 and 74 are pivotally secured to the pins 90 and 92 with the cotter keys 94 properly positioned to maintain such arrangement. Throughout such anchoring of cable puller 20 to the conduit 22, the support element for pulley 55 as well as the connectors 76 and 78 for the compression members 72 and 74 can be reaadjusted as desired so that all of the various parts and components of the cable puller are in proper relation.

The line 24 is then extended from the conduit 22, around the pulley 55, around the pulley 36 and around the drum 52 of the power unit 48. If the line 24 is extending upwardly out of conduit 22, it can be arranged around pulleys 55 and 36 as shown in FIGURE 1, and as shown in solid lines in FIGURE 13. On the other hand, if the conduit 22 is horizontally disposed or if it is in depending position, extending from an overhead position, it is a simple matter to extend the line 24 around the wheel 57 more completely. This latter arrangement is most clearly shown in dotted lines in FIGURE 13 wherein the line 24 is positioned along the underside and rear of the wheel 57. As will be readily apparent to those skilled in the art, if line 24 extends downwardly out of the conduit 22 it even more completely encircles the wheel 57 in returning upwardly to a position around the wheel 38 of pulley 36.

It should be borne in mind, of course, that the bracing means 70 is always extended from the pulley 55 toward the conduit 22 so that it would assume a horizontal position if the cable is to be pulled from a horizontally disposed conduit.

By having the line 24 secured to the drum 52, energization of motor 50 causes the line to be wound up onto the drum. This causes the line, under tension, to pull the cable through the conduit 22. Throughout such operation, of course, the members 72 and 74 are under compression, counteracting the tension force applied to the line 24.

Ultimately, the electrical cable is thus pulled through the conduit 22 until it is properly exposed at both ends of the conduit.

It should be noted that the subject cable puller 20 can be conveniently disconnected from the conduit 22 and easily removed to a different location for pulling another electrical cable through a different conduit.

Although I have shown and described certain specific embodiments of my invention, I am fully aware that many modifications thereof are possible.

I claim:

1. A cable puller comprising in combination a tripod frame comprising three tubular support members the upper ends of which are held in fixed relation by a yoke, a first pulley rotatably mounted on said yoke to receive a flexible line thereover, a second pulley adjustably mounted on two of said support members intermediate the ends thereof to receive said flexible line, an adjustable brace connected relative to said last mentioned two support members to be positioned generally along the flexible line being pulled, a platform mounted between and connected to said three support members intermediate the length of said tripod, and a power unit on said platform including a power operated drum to which said line is attached, whereby operation of said drum causes said line to be pulled around said pulleys, said adjustable brace supporting said tripod frame in a direction opposite to the pulling of said line.

2. A cable puller according to claim 1 wherein said adjustable brace comprises a pair of elongated compression members one on each side of said second pulley and extending along the line being pulled.

3. A cable puller according to claim 2 wherein said elongated compression members are anchored on opposite sides of said line a fixed distance from said second pulley.

4. A cable puller comprising in combination, a tripod frame comprising three tubular support members the upper ends of which are held in fixed relation by a yoke, a first pulley rotatably mounted on said yoke to receive a flexible line thereover, a second pulley, means to rotatably mounting said second pulley on said frame comprising a movable mounting element rotatably carrying said second pulley and adjustable fastening means for adjustably securing said mounting element between two of said support members at any desired location intermediate ends of said tripod, an adjustable brace comprising a pair of compression members connected to said mounting element on opposite sides of said second pulley and having means for being anchored on opposite sides of said line toward the source thereof, a platform mounted between and connected to said three support members intermediate the length of said tripod, and a power unit on said platform including a power operated drum to which said line is attached, whereby operation of said drum causes said line to be pulled around said pulleys, the adjustable brace supporting said tripod frame in a direction opposite to the pulling of said line.

5. A cable puller comprising in combination, a tripod frame comprising three angularly disposed spaced support members having adjacent upper end portions held in fixed relation by a yoke, a first pulley rotatably mounted on said yoke, a second pulley, mounting means for said second pulley comprising a mounting element adjustably secured relative to two of said support members, a platform secured to and between said three support members, a power unit on said platform operable to pull a line over said second and first pulleys, and bracing means for said cable puller comprising a pair of compression members having adjacent end portions adjustably secured on opposite sides of said second pulley, the other ends of said compression members being adapted with anchoring means, whereby said compression members are arranged parallel to and on opposite sides of said line and said anchoring means is secured relative to the source of the cable to which said line is attached to cause said compression members to retain said cable puller in fixed relation as the power unit operates to pull said line and cable.

6. A cable puller according to claim 5 wherein said anchoring means comprises a collar having means to fasten said collar to a conduit through which said cable is to be pulled, and pivotal fastening means on said collar to pivotally secure said other ends of said compression members thereto.

7. A cable puller according to claim 6 wherein said pivotal fastening means comprises a pair of pivot pins fixed to said collar to extend in opposite direction therefrom, said other ends of said compression members being individually formed with a transverse opening for receiving the respective one of said pivot pins, whereby said compression members can be arranged at substantially any angle to the conduit through which said cable is to be pulled.

References Cited by the Examiner
UNITED STATES PATENTS

| | | |
|---|---|---|
| 1,038,093 | 9/1912 | Crawford. |
| 2,896,911 | 7/1959 | Carpenter. |
| 2,985,430 | 5/1961 | Greenwood _____ 254—139 |
| 3,072,382 | 1/1963 | Jones _____ 254—134.3 |
| 3,201,090 | 8/1965 | Jones. |

WILLIAM FELDMAN, *Primary Examiner.*

OTHELL M. SIMPSON, *Examiner.*